(12) United States Patent
Berthold (10) Patent No.: US 9,598,140 B2
(45) Date of Patent: Mar. 21, 2017

(54) SUSPENSION FOR MOUNTAIN BICYCLES

(71) Applicant: Brian David Berthold, Martinsville, IN (US)

(72) Inventor: Brian David Berthold, Martinsville, IN (US)

( * ) Notice: Subject to any disclaimer, the term of this patent is extended or adjusted under 35 U.S.C. 154(b) by 137 days.

(21) Appl. No.: 14/377,156

(22) PCT Filed: Feb. 6, 2013

(86) PCT No.: PCT/US2013/024865
§ 371 (c)(1),
(2) Date: Aug. 6, 2014

(87) PCT Pub. No.: WO2013/119616
PCT Pub. Date: Aug. 15, 2013

(65) Prior Publication Data
US 2015/0001829 A1    Jan. 1, 2015

Related U.S. Application Data

(60) Provisional application No. 61/595,272, filed on Feb. 6, 2012.

(51) Int. Cl.
*B62K 25/26* (2006.01)
*B62K 25/28* (2006.01)
(Continued)

(52) U.S. Cl.
CPC .............. *B62K 25/286* (2013.01); *B62K 3/02* (2013.01); *B60G 2204/421* (2013.01);
(Continued)

(58) Field of Classification Search
CPC ...... B62K 25/20; B62K 25/26; B62K 25/286; B62K 2025/048
(Continued)

(56) References Cited

U.S. PATENT DOCUMENTS 5,244,224 A    9/1993  Busby
6,206,397 B1   3/2001  Klassen et al.
(Continued)

FOREIGN PATENT DOCUMENTS

TW    M417317 U1    12/2011

OTHER PUBLICATIONS

PCT/US2013/024865 Written Opinion of the ISA.
(Continued)

*Primary Examiner* — Anne Marie Boehler
(74) *Attorney, Agent, or Firm* — MacMillan, Sobanski & Todd, LLC (57) ABSTRACT

Unique suspension apparatuses, systems and methods useful for mountain bicycles among other applications are disclosed. In certain exemplary embodiments the suspension is self adjusting to meet different performance objectives. The suspension may utilize pedaling force to substantially stiffen or lock out movement of the suspension, for example, during climbing. The suspension may change its performance under reduced pedaling force to provide performance characteristics desired when a rider is descending. Certain exemplary embodiments include a rocker arm connected to a first frame portion at a first rocker arm pivot, connected to a seatstay at a second rocker arm pivot, and connected to a second link at a third rocker arm pivot. The first link is connected to the first frame portion at a first link pivot, connected to the chainstay at a second link pivot, and connected to the shock and the second link at a third link pivot.

18 Claims, 13 Drawing Sheets

(51) Int. Cl.
*B62K 3/02* (2006.01)
*B62K 25/04* (2006.01)

(52) U.S. Cl.
CPC .... *B60G 2204/424* (2013.01); *B60G 2300/12* (2013.01); *B62K 2025/048* (2013.01)

(58) Field of Classification Search
USPC ........................................ 280/284, 285, 288
See application file for complete search history.

(56) References Cited

U.S. PATENT DOCUMENTS

| | | |
|---|---|---|
| 7,427,077 B2 | 9/2008 | Lesage et al. |
| 7,712,757 B2 | 5/2010 | Berthold |
| 7,717,212 B2 * | 5/2010 | Weagle ................ B62K 25/286 180/227 |
| 7,837,213 B2 | 11/2010 | Colegrove et al. |
| 2007/0194550 A1 | 8/2007 | Wadelton |
| 2007/0246909 A1 | 10/2007 | Weng |
| 2008/0258427 A1 | 10/2008 | Buckley |
| 2009/0315296 A1 | 12/2009 | Berthold |
| 2010/0264623 A1 * | 10/2010 | Peterson .............. B62K 25/286 280/283 |
| 2012/0228850 A1 * | 9/2012 | Tseng .................. B62K 25/286 280/283 |
| 2015/0054250 A1 * | 2/2015 | Hu ........................ B62K 25/28 280/276 |

OTHER PUBLICATIONS

PCT/US2013/024865 Int'l Search Report.
PCT/US2013/024865 Int'l Preliminary Report on Patentability.
European Extended Search Report, Application No. EP 137464962, dated Jun. 23, 2016.

\* cited by examiner

SUSPENSION FOR MOUNTAIN BICYCLES

CROSS-REFERENCE TO RELATED APPLICATIONS

This application is the National Phase of International Application PCT/US2013/024865, filed Feb. 6, 2013 which designated the U.S. and that International Application was published in English under PCT Article 21(2) on Aug. 15, 2013 as International Publication Number WO 2013/119616 A1. PCT/US2013/024865 claims priority to U.S. Provisional Application No. 61/595,272, filed Feb. 6, 2012. Thus, the subject nonprovisional application claims priority to U.S. Provisional Application No. 61/595,272, filed Feb. 6, 2012. The disclosures of both applications are incorporated herein by reference.

BACKGROUND

The present disclosure relates generally to the field of bicycle suspensions and geometry and more particularly mountain bicycle suspensions. Mountain bike suspension has offered a number of advantages to riders including the ability to ride extreme mountain and desert terrain as well as increasing comfort for the more casual rider. While offering certain benefits, current mountain bike suspension systems suffer from a number of limitations, drawbacks and design compromises. For example, mountain bike rear suspension should ideally perform very differently under different riding conditions. While climbing the suspension would preferably be very stiff or locked out and should resist or eliminate rider bob associated with hard pedaling. Furthermore, it would be desirable to change overall frame geometry so that fork rake is steeper and rider position is advanced forward to suit the needs of a climb. In contrast, downhill descents present very different, and apparently conflicting, performance needs. When descending it would be desirable to change frame geometry to move the rider position rearward and provide a less steep fork rake. Furthermore, different spring rate, compression and rebound characteristics would be desired. On relatively level terrain the suspension needs are different still. These are but a few examples of a fundamental and long felt need in mountain bike suspension, namely, the need for different suspension and different frame geometries to accommodate the varied and contrasting riding conditions encountered by a mountain bike. Heretofore many efforts at improved mountain bike suspension have been attempted but have not overcome the what appear to be fundamental design compromises. A number of these attempts and their shortcomings are discussed in my U.S. Pat. No. 7,712,757 ("the '757 Patent"). The '757 patent, and its commercial embodiments in the Kona® MagicLink,™ represent the most significant effort to meet the challenges described above. While these designs provide significant benefits as to performance and function of mountain bicycle suspension, they too are subject to a number of limitations that appear to require fundamental design compromises including needs for multiple shocks and biasing members among others. There remains a long felt, unaddressed need for mountain bike suspension systems that provide fundamentally different performance and geometries across the gamut of potential riding conditions.

DISCLOSURE

For the purposes clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall be understood that no limitation of the scope of the invention is thereby created, and that the invention includes and protects such alterations, modifications, and further applications of the exemplary embodiments as would occur to one skilled in the art to which the invention relates.

BRIEF DESCRIPTION OF DRAWINGS

Exemplary embodiments are illustrated in referenced figures of the drawings. It is intended that the embodiments and figures disclosed herein are to be considered illustrative rather than restrictive.

DETAILED DESCRIPTION OF EXEMPLARY EMBODIMENTS

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The term "bicycle" used herein refers both to chain-driven pedal-powered bicycles and chain-driven motor-powered bicycles or motorcycles. While the exemplary embodiments disclosed herein have particular utility for mountain bicycles, they are also useful for any type of chain-driven bicycle or motorcycle.

Figures 1A, 1B:
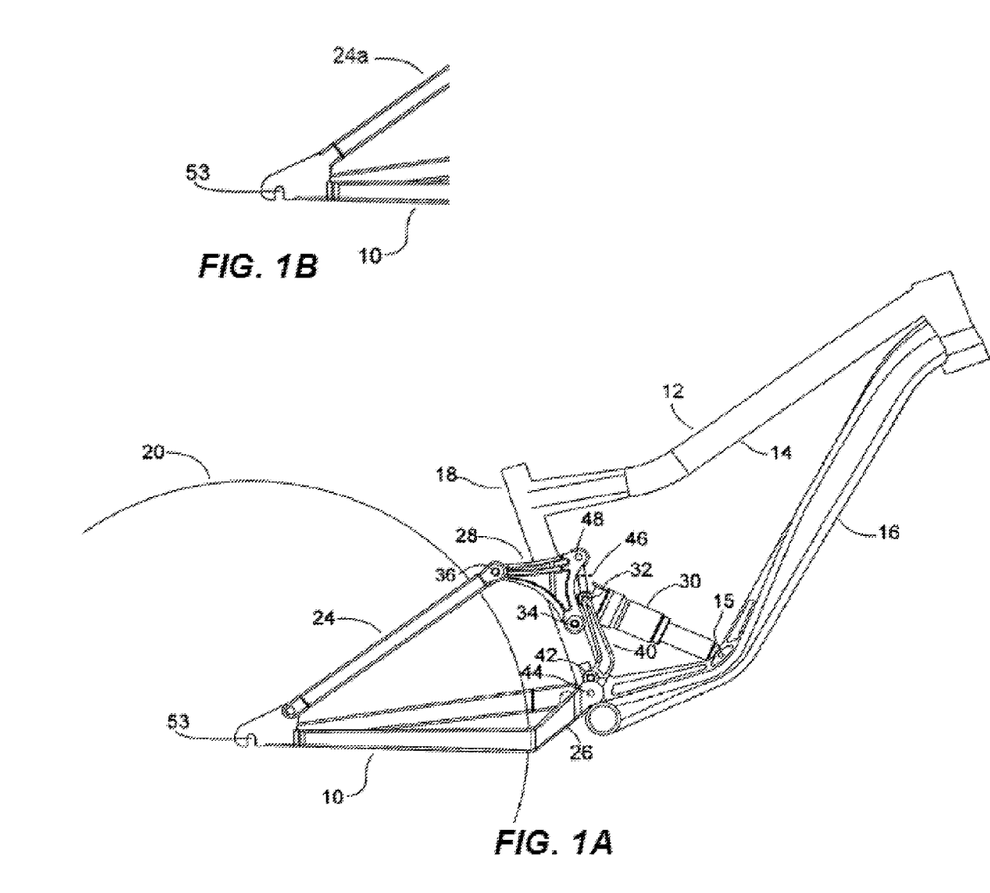
FIG. 1A is an elevation view showing the bicycle suspension of an exemplary embodiment at rest with substantially no vertical or horizontal loading and with the suspension fully extended.
FIG. 1B is an elevational view, similar to FIG. 1A, showing another embodiment of the bicycle suspension at rest with substantially no vertical or horizontal loading and with the suspension fully extended.

With reference to FIG. 1A, a rear wheel suspension system is designated as 10 mounted on bicycle frame 12 consisting of a top tube 14, down tube 16 and seat tube 18. Rear wheel 20 rotates on an axle (not shown) which is mounted at 53 on the chainstay 26 which is connected to a pair of seatstays 24. In the illustrated embodiment, the chainstay 26 is pivotally connected to the seatstays 24, however, in some embodiments the chainstay 26 may be non-pivotally or rigidly connected to seatstays 24a, as shown in FIG. 1B. Rocker arm 28 pivots on the seat tube 18 at 34 and pivotally links seatstay 24 at pivot axis 36 and driven link 46 at pivot axis 48. A lower link 40 pivots on frame 12 at pivot axis 42 and is pivotally connected to the upper end of shock absorber 30 at 32. Driven link 46 is pivotally connected to the upper end of the shock 30 and upper end of link 40 at pivot axis 32. Chainstay 26 pivotally connects to the lower link 40 at 44. The lower end of shock absorber 30 is pivotally connected to the frame at connection 15.

Figure 2:
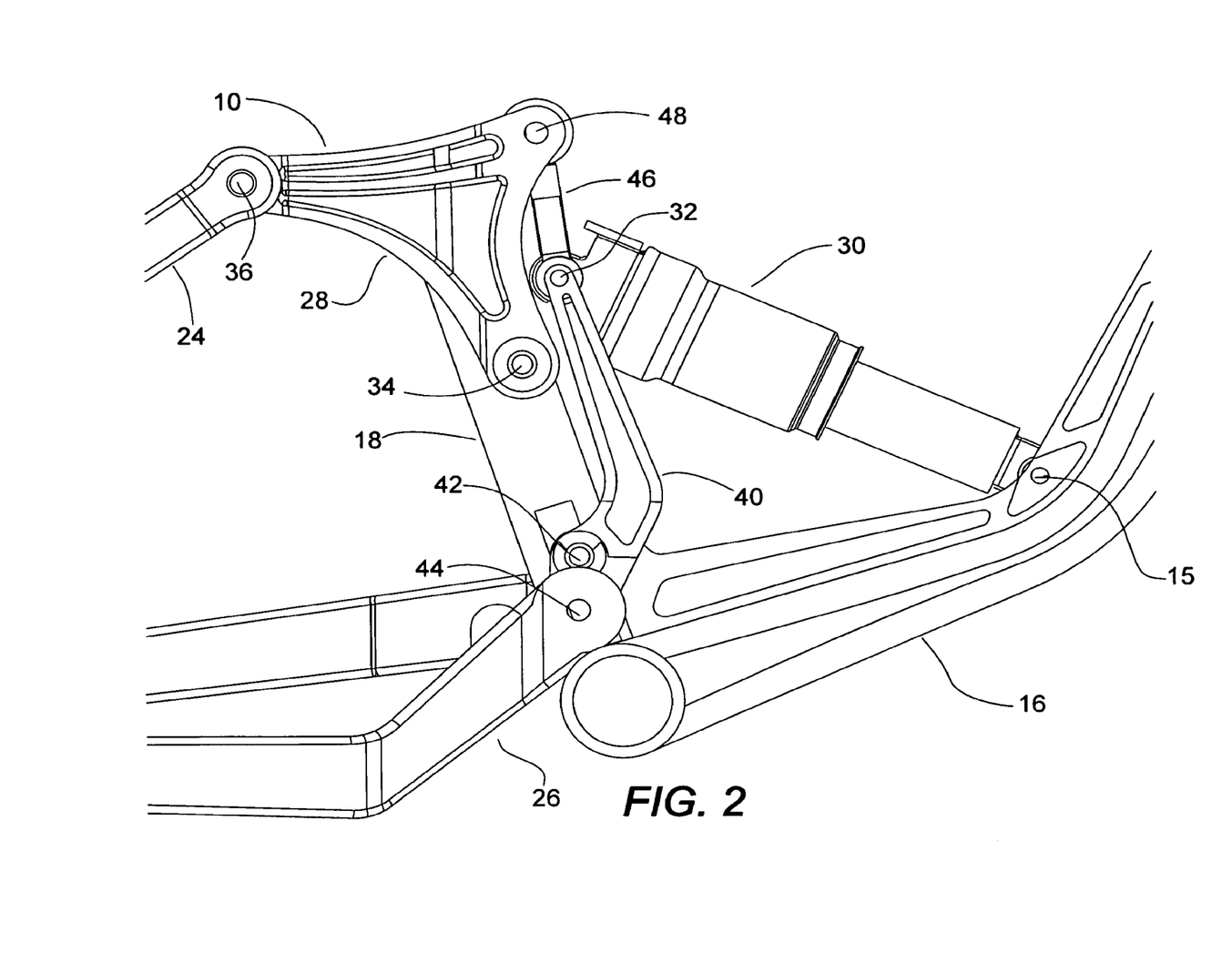
FIG. 2 is a detail elevation view showing an embodiment of the link of the bicycle suspension of an exemplary embodiment.
Figure 3:
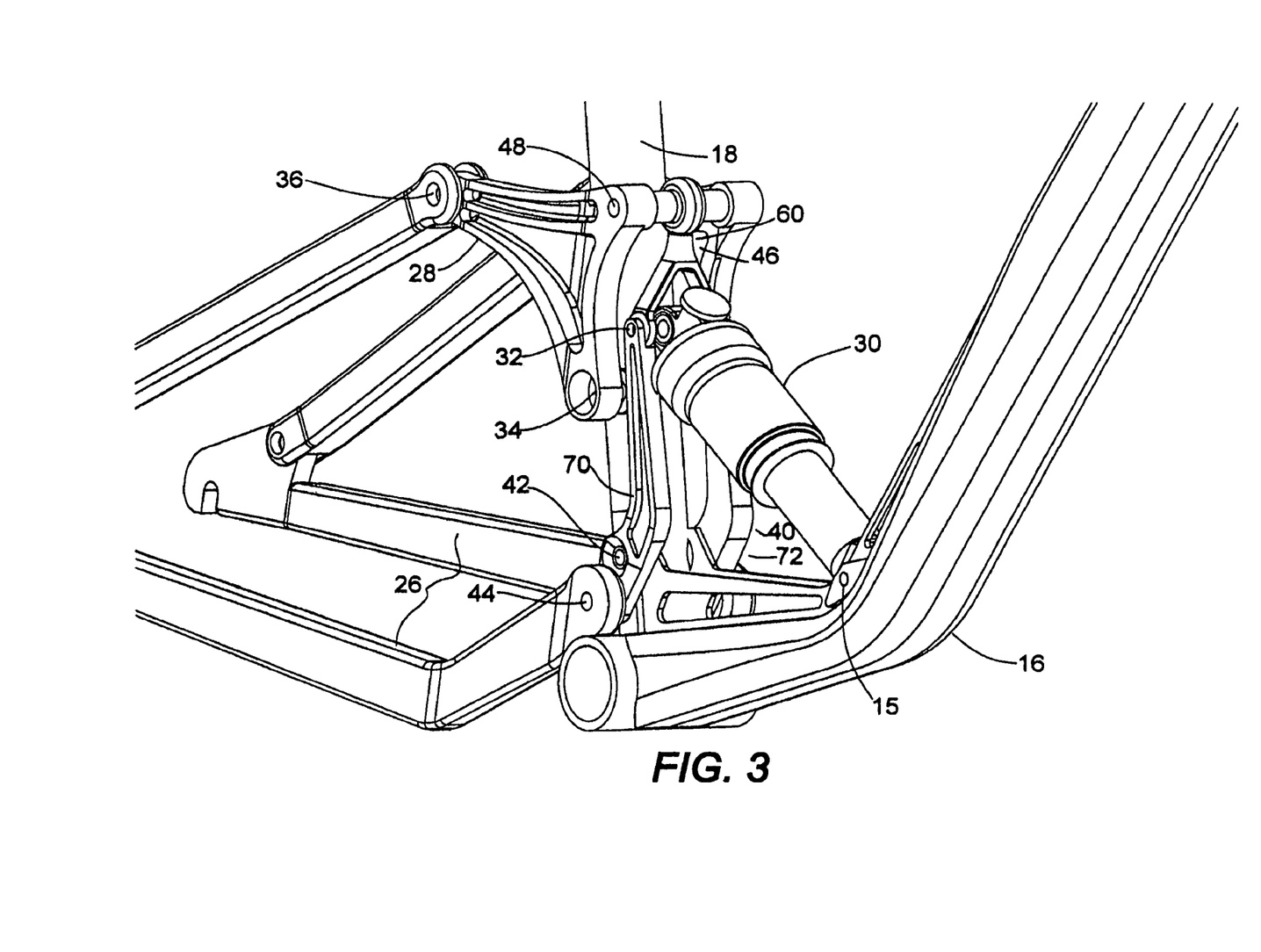
FIG. 3 is a perspective view showing the link of the bicycle suspension of an exemplary embodiment.
Figure 4A:
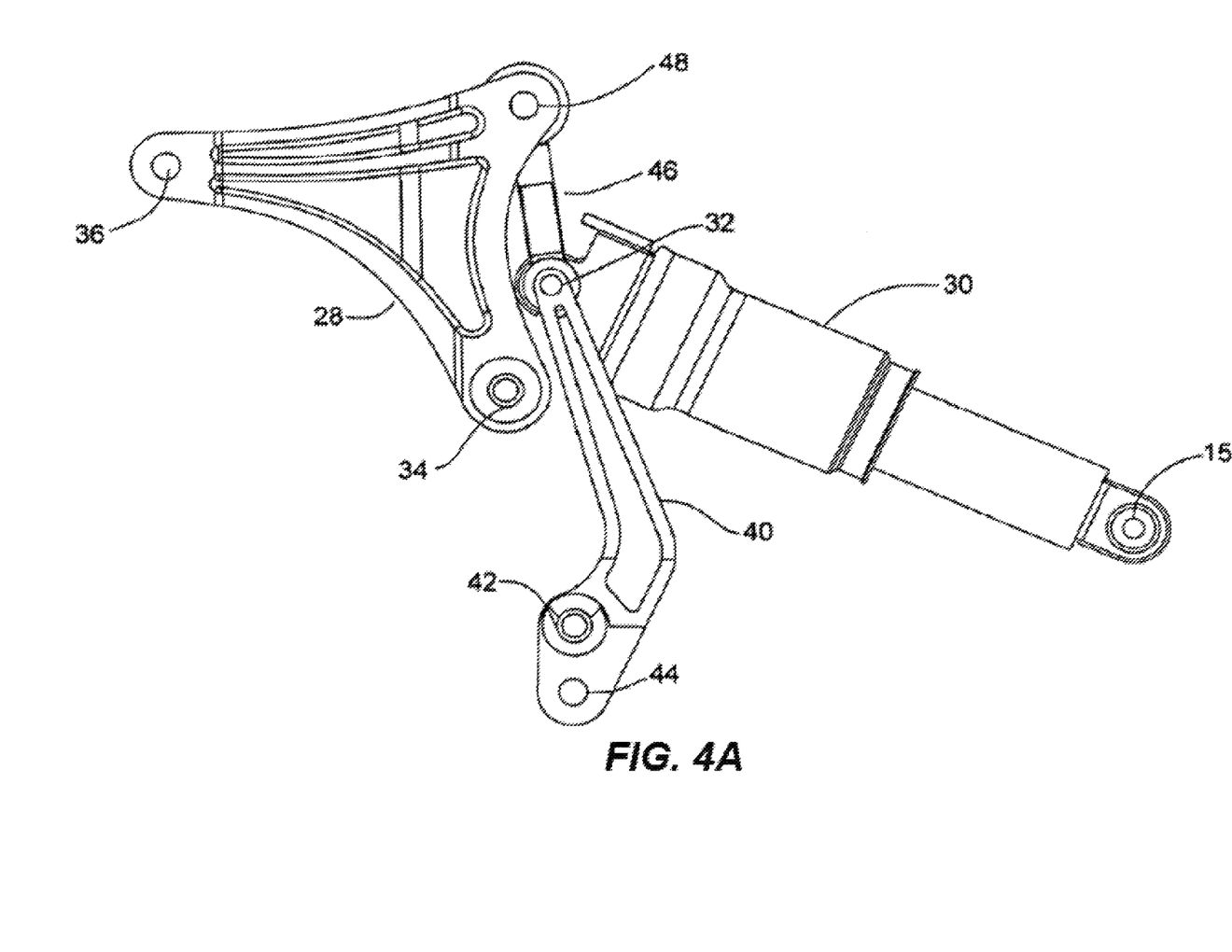
FIG. 4A is a side elevation view showing the link of the bicycle suspension of an exemplary embodiment in isolation.
Figure 4B:
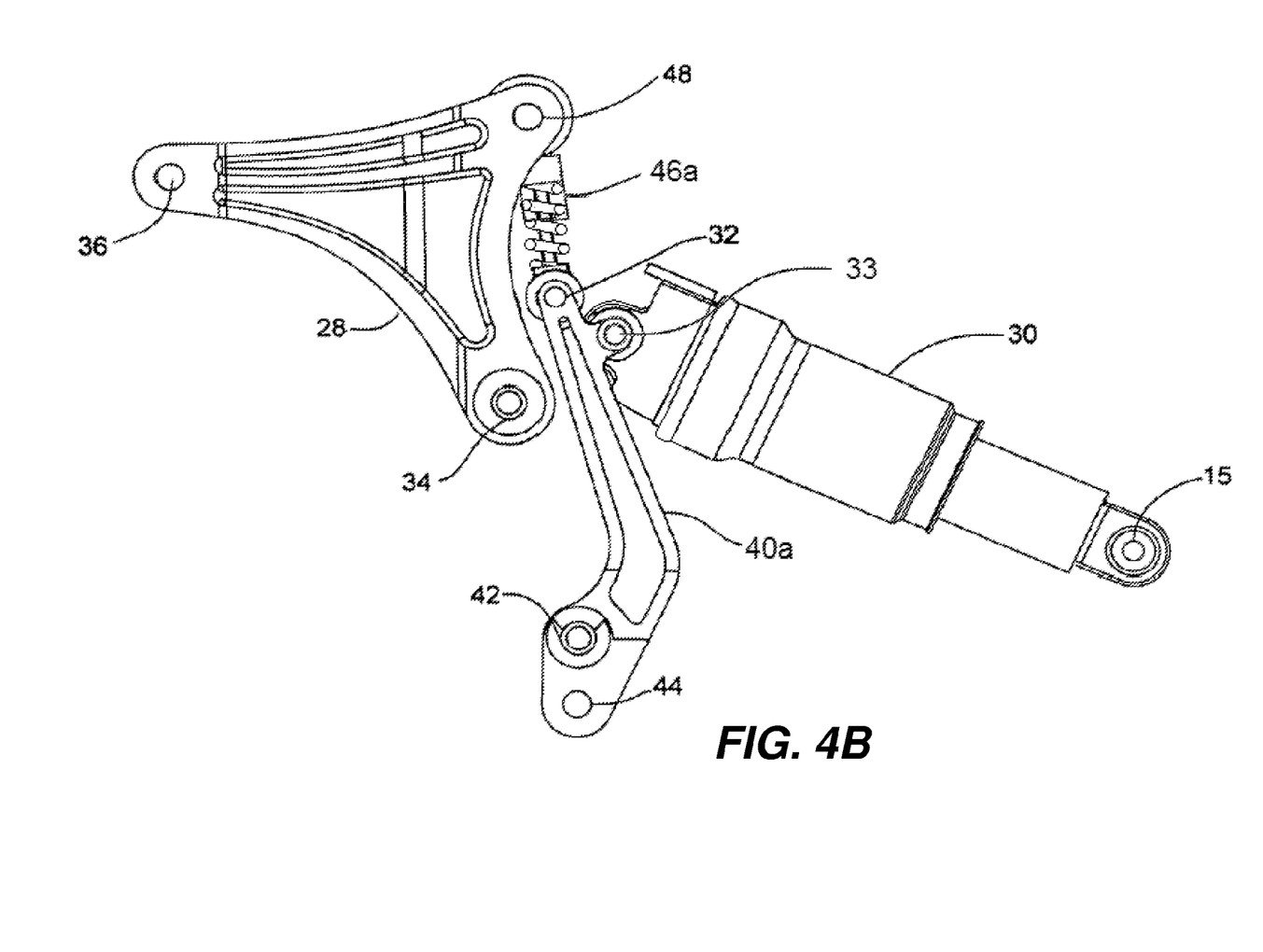
FIG. 4B is a side elevation view of an alternative embodiment of the link of the bicycle suspension including a spring/damper driven link.
Figure 5:
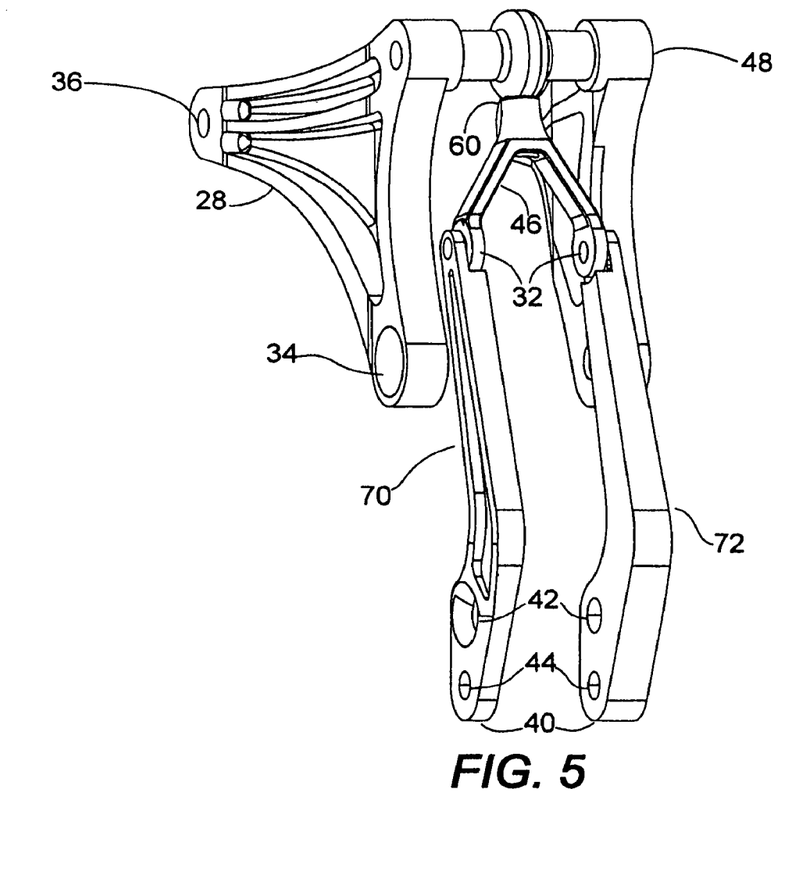
FIG. 5 is a front perspective view showing the link of the bicycle suspension of an exemplary embodiment in isolation.

FIG. 2 is a detail of link 40 illustrating the upper end of link 40 in the rearward position. FIG. 3 illustrates the link 40 in perspective. In this embodiment link 40 comprises two parallel forks 70, 72, pivotally mounted on the frame 12 at pivot axis 40, which attach to the upper shock mount 32. As illustrated, the length of driven link 46 can be changed by the rider using the threaded rod end 60. This alters the suspension characteristics by altering the geometry. FIGS. 4A, 4B and 5 are additional detailed views of the components illustrated in FIGS. 1A-3. As shown in FIG. 4B, the driven link 46 may be configured as an auxiliary spring/damper 46a. An alternative embodiment of link 40a includes a fourth pivot 33 that permits relocation of the spring/damper 30 to a point away from the third pivot 32. The fourth pivot 33 may positioned at other points along the link 40a to suit different spring/dampers or provide alternative suspension deflection responses.

Figure 6:
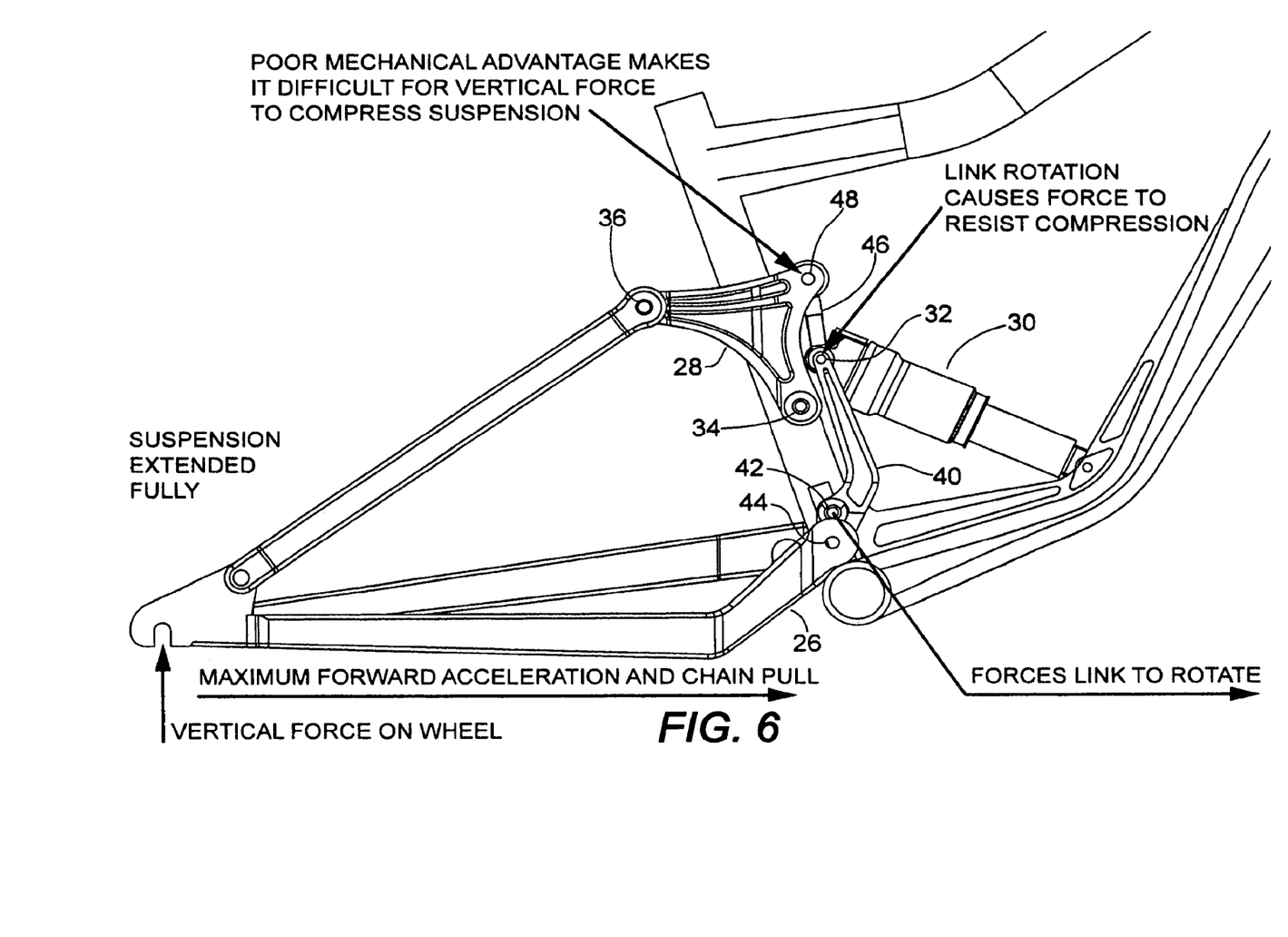
FIG. 6 is an elevation view showing the bicycle suspension of an exemplary embodiment under power or forward acceleration with the suspension fully extended.
Figure 7:
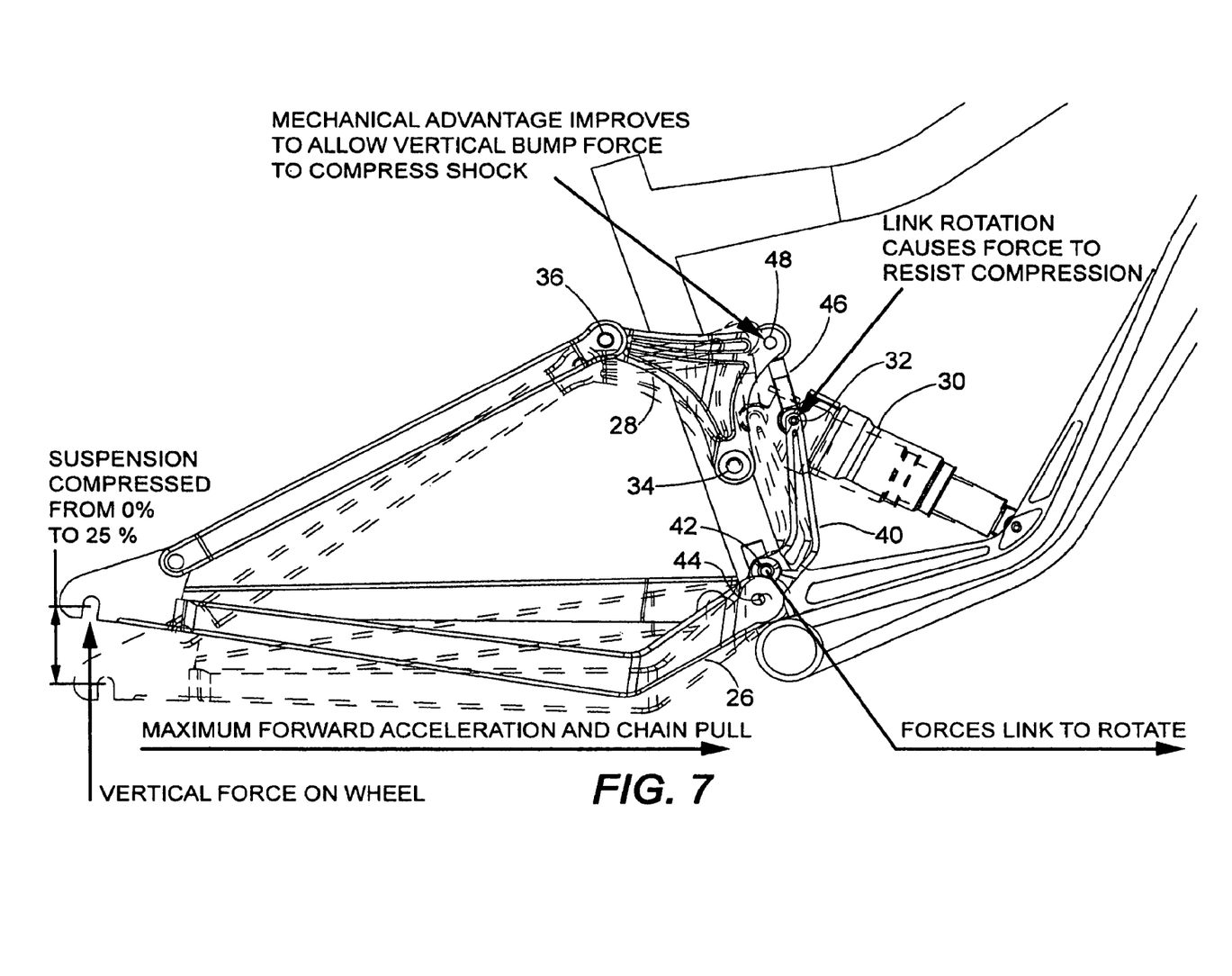
FIG. 7 is an elevation view showing the bicycle suspension of the invention under power or forward acceleration while compressed 25% due to rider weight, and shown at full extension in phantom for comparison.

When pedaling power/forward acceleration is applied, as shown in FIGS. 6 and 7, the chain pull and reaction force at the tire/ground interface pushes the wheel 20 and chainstay 26 forward relative to the frame 12. This forces the lower end of link 40 forward and the upper end of link 40 rearward, with the upper shock mount 32 along with it. When the upper end of link 40 moves rearward, it also moves the lower end of driven link 46 to the rear. This changes the motion ratio and rising rate characteristics of the shock 30 to become stiffer in the initial part of the travel. It also causes a steeper (more vertical) fork rake and seat tube angle, and places the rider in a more aggressive position over the pedals, and moves the rider weight bias to the front. Since the lower end of link 40 moves forward, the attached chainstay 26 is at its shortest length relative to the frame, for enhanced, optimized or maximum climbing ability. The harder the pedaling effort, the more the chainstay 26 is forced forward, pushing the lower end of link 40 forward and the upper end of link 40 rearward.

At one extreme, as shown in FIG. 6, the link 40 can rotate to the degree that the vertical force on the rear wheel 20, acting through the seatstay 24 and the rocker 28, tries to rotate the top of link 40 further rearward, further delaying/impeding the top of the link's tendency to rotate to the front under braking and/or bump forces. For example, this might be more desirable for a bike that was made specifically for climbing.

This alignment of pivots 32, 42, 48 can be geometrically configured to occur when the upper end of link 40 is pushed to a rearward position due to pedaling/forward acceleration forces. In these conditions, the upper end of link 40 will stay rearward even when the rider's pedal input (and therefore forward acceleration force) varies with crank frequency. Without this alignment, the link 40 would tend to rotate whenever pedaling pressure was momentarily reduced. This link rotation would allow undesirable effects such as vertical chassis movement, soft/lazy forward acceleration response, and less vertical fork and seat angles. Normally, these effects would cycle freely as those forces vary, but the alignment of the links, combined with the stiff motion ratio, substantially or entirely eliminate those undesirable effects.

FIG. 6 illustrates that the bicycle suspension of an exemplary embodiment 10 under high to maximum power or forward acceleration, such as a climb, while the suspension is fully extended, has a tendency to keep the upper end of link 40 rearward and the suspension fully extended until a bump and/or braking force is encountered.

FIG. 7 shows the suspension compressed 25% due to rider weight, while under forward acceleration. This would be a condition seen on level ground, pedaling hard. As in FIG. 6, the horizontal force from forward acceleration on rear wheel 20 pushes the chainstay 26 forward, rotating the bottom of link 40 forward and the top of link 40 rearward. This horizontal force is less than in FIG. 6, which could only occur during extreme climbing. In FIG. 7, this force is not strong enough to counteract the rider's weight, thus the suspension will not extend to a position less than 25% compressed. But, this force is strong enough to resist any vertical force inputs due to motion of the rider or to any suspension compression effects due to pedaling and chain pull that afflict conventional suspension designs. The result is a very firm suspension feel, with a stiff response to pedaling efforts. There is highly mitigated to substantially no unwanted bobbing or cycling of the suspension due to normal chain pull induced suspension compression of conventional designs.

At this position in the suspension travel, any effort to extend the suspension further is also met by increased rebound damping due to the increased motion ratio in that direction. This results in increased stability in rough terrain where the rear suspension might have a tendency to extend too fast and kick the back of the bike up.

Figure 8:
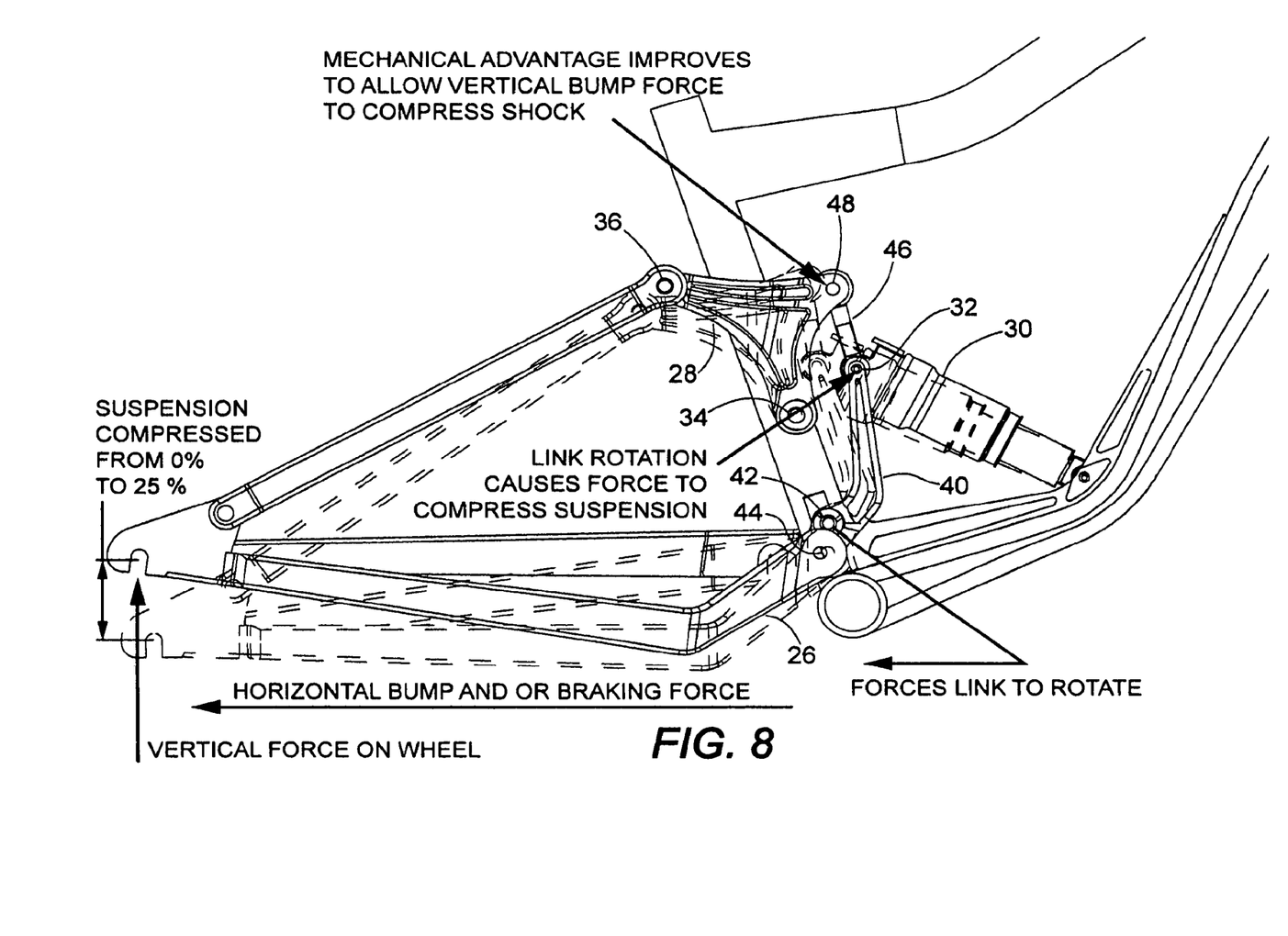
FIG. 8 is an elevation view showing the bicycle suspension of an exemplary embodiment under bump or braking forces with the suspension sagging (compressing) a normal 25% due to the rider's weight and shown at full extension in phantom for comparison.
Figure 9:
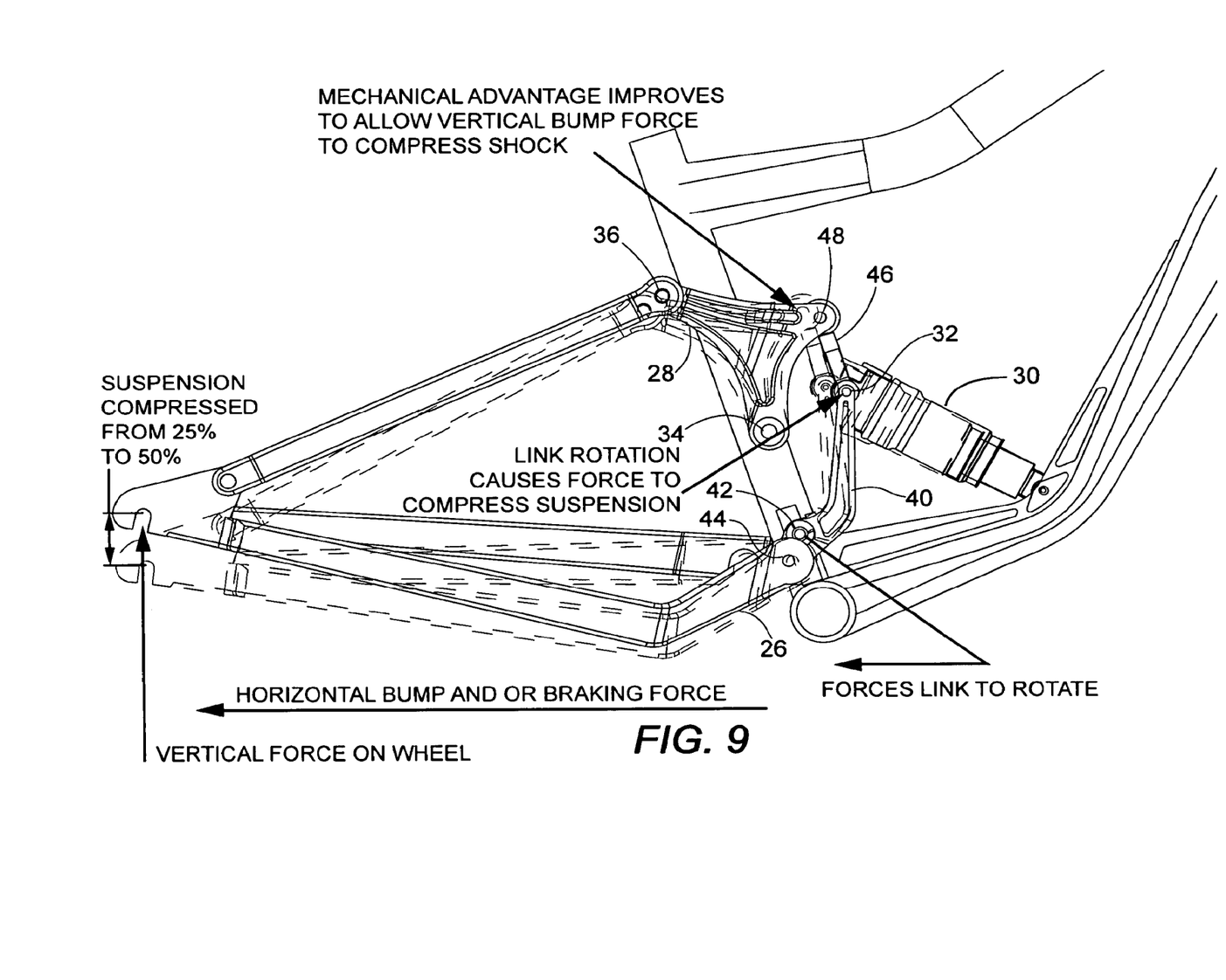
FIG. 9 is an elevation view showing the bicycle suspension of an exemplary embodiment under compression from 25% to 50% of its total travel and encountering bump and/or braking forces.

FIGS. 8 and 9 illustrate the effect of a bump or braking on rear wheel 20 when the suspension is either fully extended, or compressed 25% due to rider weight, respectively. Either force will cause the bottom of link 40 to rotate rearward, driving the upper end of link 40 forward.

FIG. 8 shows that even if the suspension had been fully extended due to high to maximum acceleration during a climbing effort, a bump or braking force would initiate a sequence of events that would allow the suspension to compress and absorb the bump. The horizontal component of the bump force on the rear wheel 20, acting in the opposite direction of the previous high to maximum forward acceleration and chain force, would pull the chainstay 26 to the rear and thus rotate the bottom of link 40 to the rear. The subsequent rotation of the top of link 40 to the front initiates shock compression. At the same time the mechanical leverage of the driven link increases in ability to compress the shock due to vertical bump forces.

The rotation of link 40 changes the alignment of all the aforementioned pivot points, such as the upper shock mount 32 and the chainstay pivot 44, allowing the main shock 30 to gain a leverage advantage/transmission angle at a point where the extra suspension and all of the other benefits are most needed.

In this area of suspension travel, between full extension and 25% compressed as shown in FIGS. 6, 7 and 8, the motion ratio is relatively stiff (under 2:1 as in the embodiment shown) compared to the rest of the suspension travel. This means that the rear wheel will have to experience a larger force to compress the shock than in the later part of the travel, (between 25-50% compressed as shown in FIG. 9, where the MR falls to 2.7:1). The result is a very stiff suspension response to any vertical inputs on the rear wheel in this part of the travel, which would only be used for extreme pedaling efforts such as climbing.

FIG. 9 shows the bicycle suspension of an exemplary embodiment when at a normal compression of 25% due to rider weight, and a horizontal bump or braking force has occurred. As shown in FIG. 9, a bump force or braking force is encountered where there is substantially no forward pedaling or acceleration force. This would be representative of traveling on level ground or downhill. The results are similar to that shown in FIG. 8. The bump force has a vertical component as well as a horizontal component, which pushes the wheel 20 to the rear. This in turn, pulls the chainstay 26 and therefore rotates the bottom of link 40 to the rear. This causes the upper end of link 40 to move forward. This will enable driven link 46 to compress the shock 30 by increasing its mechanical leverage. This also causes the motion ratio of rear wheel 20 to shock absorber 30, to rapidly change from 1.8:1 to 2.7:1 in the range of travel between 25% and 50% as shown in FIG. 9, right where enhanced, optimal, or maximum compliance and bump absorption are needed.

This allows the most rapid response for the wheel to roll over the bump with the least resistance, and the least reaction force input to the chassis/rider.

The suspension will be more plush in the initial stages and on smaller bumps, to better absorb the bumps. It also causes the fork angle and seat tube angle to relax, adding stability (especially at high speeds and/or descending), and shifts rider weight to the rear. The movement of the bottom of link 40 to the rear also means that the chainstay 26 and thus the rear wheel 20 are moving to the rear. This provides the benefit of additional ability to absorb square edge bumps and also aids stability at high speeds and/or descending.

When the link 40 rotates to rear, the changes in the shock motion ratio mean that the rear wheel 20 will have more vertical travel for each increment of shock compression. This results in a suspension that has more travel available when it is needed most (i.e. hitting bumps) as shown in FIGS. 8 and 9, and less suspension travel when it is not needed (i.e. climbing) as shown in FIGS. 6 and 7. The result is two different suspension systems on one bike, as well as two different frame geometries on one bike. Both of these attributes change immediately and automatically in response to the forces acting on the bike. The rider need not make any adjustment for the changes to occur, just ride the bike and let the forces compensate for the conditions.

Under braking, the horizontal force pulling the wheel to the rear is magnified, and the changes are more aggressive, making those benefits more pronounced when they are needed most. The larger the bump force, or more aggressive the braking effort, the more the bottom of link 40 wants to rotate to the rear. During braking, the advantages of better bump absorption, more rearward rider weight bias and geometry changes result in much more rear wheel traction, allowing a much higher braking force from the rear wheel 20. During combined descending and braking over bumps, these advantages are magnified. High speed stability of the bicycle under braking is also enhanced due to the rearward weight transfer and less vertical fork rake angle.

Figure 10:
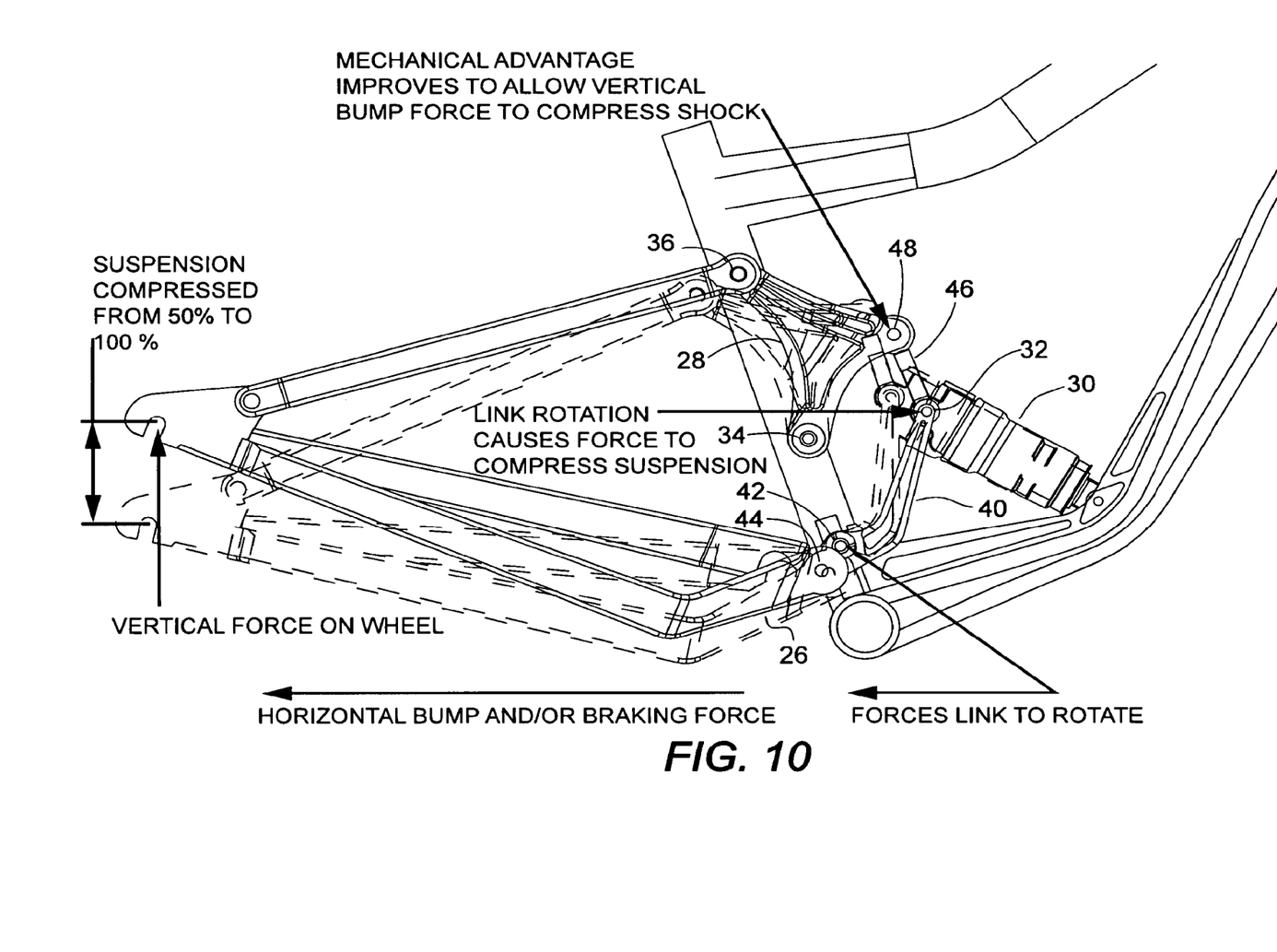
FIG. 10 is an elevation view showing the bicycle suspension of an exemplary embodiment under compression from 50% to fully compressed.
Figure 12:
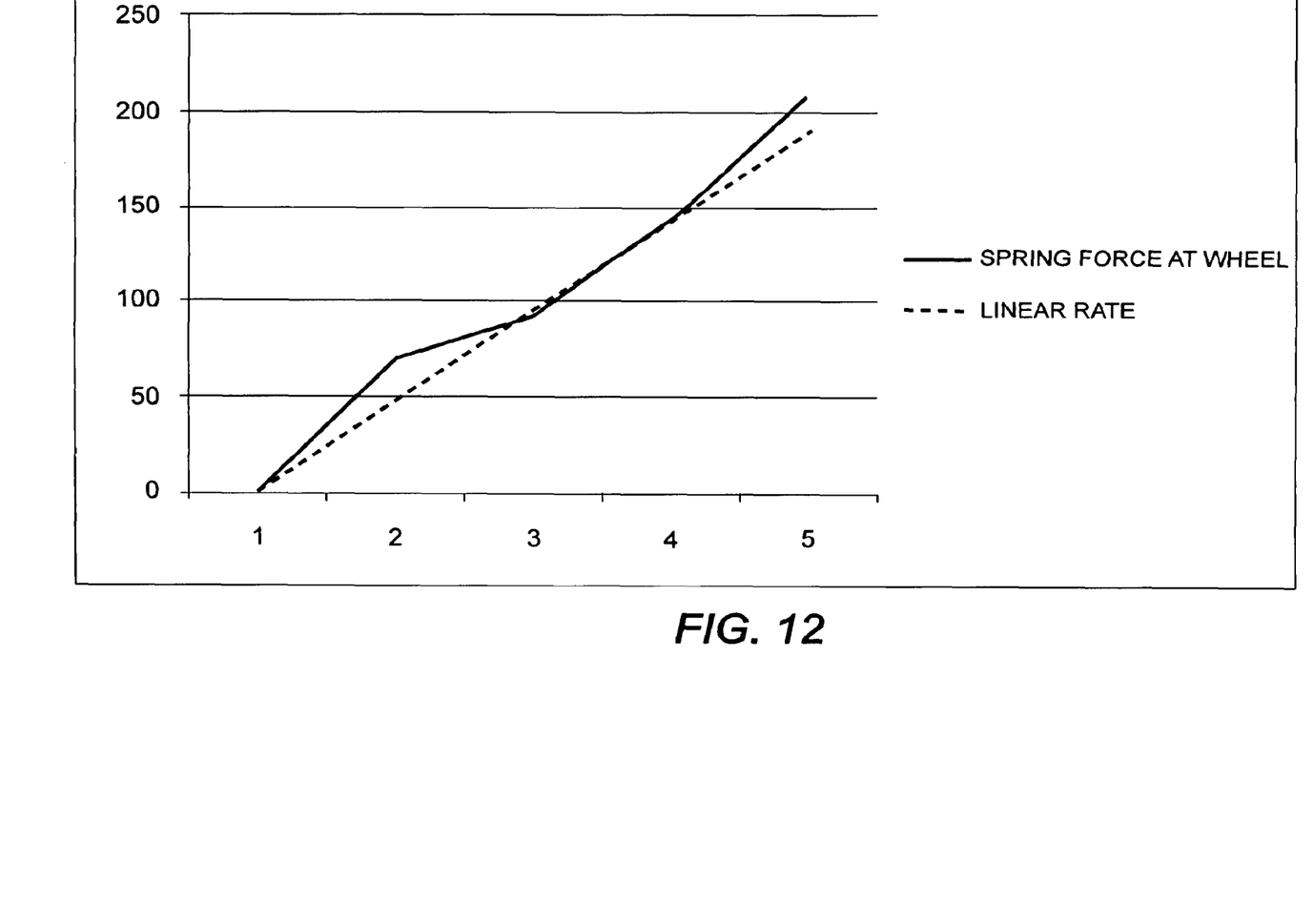
FIG. 12 is a graph showing a spring rate curve throughout the range of travel.

FIG. 10 shows the suspension being compressed from 50%-100%. In this area of suspension travel, resistance to "wallowing," or remaining too deep in the travel, and resistance to bottoming are top priorities. Normally a large, fast bump or jump landing has occurred to cause the suspension to compress to this extent. The falling rate motion ratio shown in FIG. 9, would no longer be suitable. Thus the motion ratio shown in FIG. 10 can be configured to be a linear or rising rate to insure a bottomless feel to the largest impacts. This is also shown in the graph of FIG. 12.

Thus it is possible to manipulate the force level required to rotate the link, allowing the ability to configure the link to suit various priorities, such as pure climbing or descending. The horizontal force input from the forward or rearward acceleration acting on the chainstay 26 can also be manipulated to modify its effect on the rotation of link 40. The lever arm and angle of transmission both have an effect, as illustrated in FIG. 11.

Figure 11:
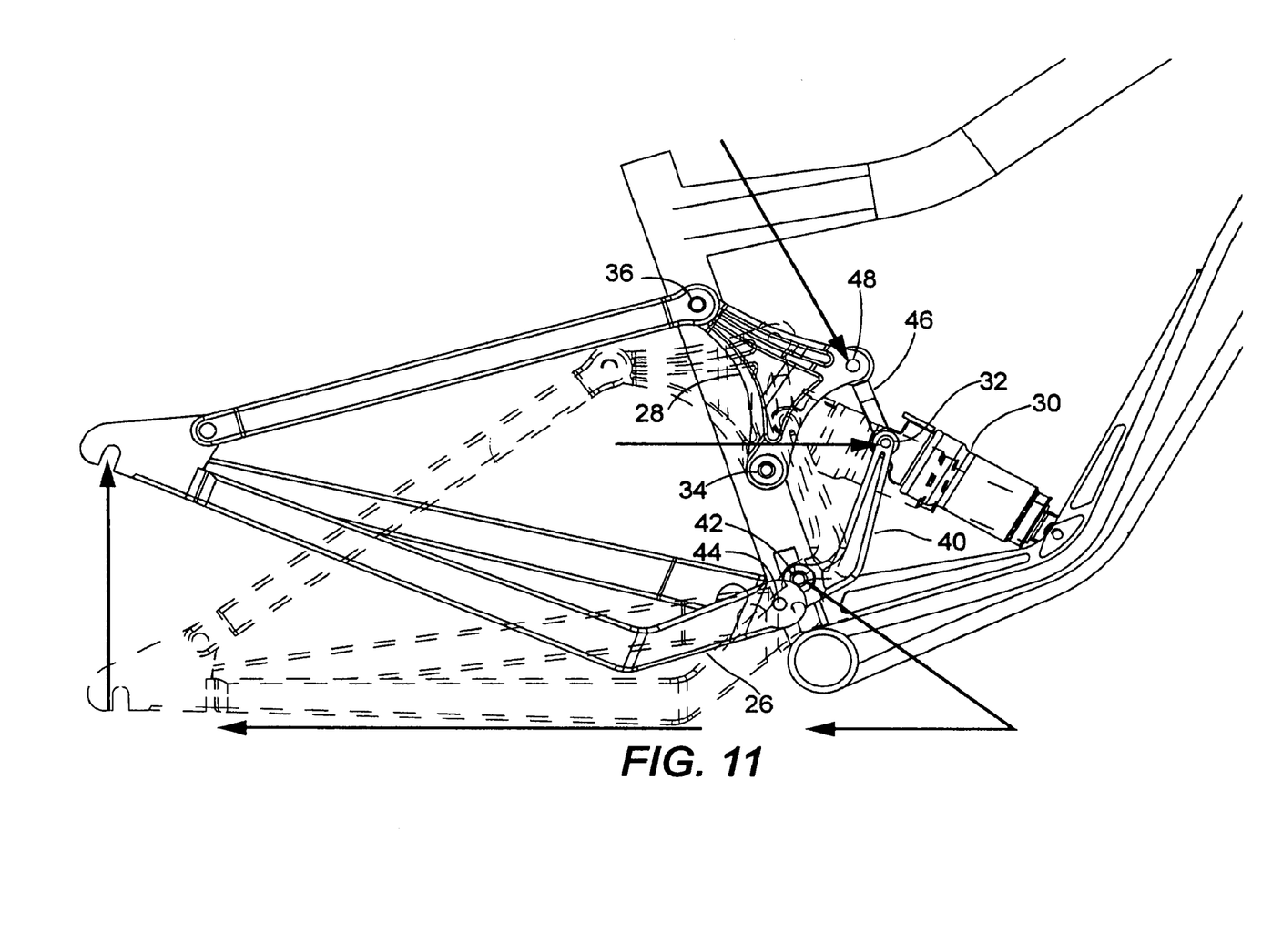
FIG. 11 is an elevation view showing the bicycle suspension of an exemplary embodiment with the suspension fully compressed and with it fully extended in phantom for comparison.

FIG. 11 illustrates the comparison of the link in the forward and rear positions with the shock 30 extended and compressed (in phantom). In the preferred embodiment for bicycles, several force relationships are utilized to create the unique interactions. As shown in FIG. 11, the alignment of connecting pivot points in the link 40 can be manipulated such that any initial vertical force at the rear wheel 20, acting through the chainstay 26 and rocker 28 will have little to no leverage to compress the shock 30 or activate the link 40 causing it to rotate. By aligning the pivots 32, 42, 48 as shown in a nearly straight line, the vertical input force from the rear wheel 20 (mainly due to rider weight or vertical motion by the rider) is transmitted to the link 40 with the worst possible transmission angle and leverage for purposes of rotating the link and compressing the shock. This means that all vertical input forces from the rider; i.e. static weight or pedaling input, have less ability to cause the upper end of link 40 to rotate to the front, and less ability to compress the shock 30 and allow the rear wheel to travel up or the bike to travel downward.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Furthermore, while a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A rear suspension for a bicycle, said bicycle comprising a frame and a rear wheel mounted for rotation on an axle, said axle mounted on a chainstay, said chainstay connected to said frame, said rear suspension comprising:
    a linking element pivotally connected to said frame at a first pivot axis wherein the forward end of said chainstay is pivotally connected to said linking element at a second pivot axis on said linking element;
    a spring/damper unit having a lower end and an upper end, said spring/damper unit being pivotally connected at a third pivot axis on an upper end of said linking element;
    a seatstay having an upper end and a lower end, the upper end of said seatstay is pivotally connected to a rocker arm which is pivotally mounted on the frame, a driven link is pivotally connected to the rocker arm at an upper end of the driven link and a lower end of the driven link is pivotally connected to the linking element;
    wherein said second pivot axis is thereby movable forwardly and rearwardly in relation to said frame in response to forward acceleration and rearward deceleration or braking forces respectively, thereby rotating said linking element about said first pivot axis and rotating said third pivot axis rearwardly and forwardly respectively, thereby moving said third pivot axis rearwardly and forwardly in relation to said frame.

2. A rear suspension for a bicycle according to claim 1 wherein said chainstay is pivotally connected to the seatstay.

3. A rear suspension for a bicycle according to claim 1 wherein the upper end of said linking element includes a fourth pivot axis that is pivotally connected to said driven link lower end.

4. A rear suspension for a bicycle according to claim 1 wherein said driven link lower end and said spring/damper upper end are pivotally connected at the third pivot axis of said linking element.

5. A rear suspension for a bicycle according to claim 4 wherein said driven link is adjustable lengthwise to change at least one of frame geometry and suspension characteristics.

6. A rear suspension for a bicycle according to claim 4 wherein said driven link is an auxiliary spring damper unit.

7. A rear suspension for a bicycle according to claim 1 wherein said chainstay is rigidly connected to said seatstay.

8. A rear suspension for a bicycle according to claim 1 wherein said chainstay is a pair of chainstays spaced apart on different sides of a rear wheel and is a pair of spaced-apart linking elements spaced apart on different sides relative to the rear wheel, each linking element pivotally connected to the frame and to the forward end of the respective chainstay on the same side of the rear wheel.

9. A rear suspension for a bicycle according to claim 8 wherein the lower end of the driven link is configured as a fork such that the fork legs are connected to the third pivot axis defined by the spaced-apart linking elements.

10. A rear suspension for a bicycle according to claim 9 wherein the upper end of the spring/damper is connected to the third pivot axis between the fork legs of the driven link.

11. A rear suspension for a bicycle according to claim 1 wherein an alignment of the second and third pivot axes of the linking element is offset relative to the first pivot axis.

12. A rear suspension for a bicycle according to claim 1 wherein an alignment of the pivot axis of the upper end of the driven link, the first and third pivot axes of the linking element can be geometrically configured to occur when the upper end of the linking element is pushed to a rearward position due to pedaling/forward acceleration forces.

13. A rear suspension for a bicycle according to claim 12 wherein the alignment of said pivot axes can be adjusted to provide resistance to compression while in a fully extended mode.

14. A rear suspension for a bicycle comprising a linking element configured to be pivotally supported by a frame mounting pivot axis and pivotally connected to a chainstay at a first end located on one side of the frame mounting pivot axis and pivotally connected to a seatstay and a spring/damper at a second end located on the other side of the frame mounting pivot axis, an upper end of the seatstay is pivotally connected to a rocker arm which is pivotally mounted on the frame, a driven link is pivotally connected to the rocker arm at an upper end of the driven link and a lower end of the driven link is pivotally connected to the linking element, the linking element configured such that the relationship between said pivot axes is responsive to one of a pedal acceleration force and a rear wheel braking force.

15. A rear suspension for a bicycle according to claim 14 wherein the relationship between said pivot axes of the linking element are arranged to provide a linear rate of motion between said spring/damper and a rear wheel.

16. A rear suspension for a bicycle according to claim 15 wherein the relationship between said pivot axes can be arranged to provide one or more of the linear rate of motion, a rising rate of motion between said spring damper unit and said rear wheel where said spring/damper unit compresses more for each additional increment of travel of said rear wheel, a falling rate of motion between said spring damper unit and said rear wheel, wherein said spring/damper unit compresses less for each additional increment of said rear wheel travel, and a variable motion ratio between said spring/damper unit and said rear wheel where the motion ratio is tailored to vary throughout the travel.

17. A bicycle frame comprising:
    a first frame portion including a head tube connected to a top tube and a down tube, a seat tube connected to the top tube and to a bottom bracket shell, and a down tube connected to the head tube and to the bottom bracket shell;
    a second frame portion including a rocker arm, a seatstay, a chainstay, a first link, and a second link; and
    a shock coupled to the first frame portion and the second frame portion;
    wherein the rocker arm is connected to the first frame portion at a first rocker arm pivot, and to the seatstay at a second rocker arm pivot and to the second link at a third rocker arm pivot, and the first link is connected to the first frame portion at a first link pivot, to the chainstay at a second link pivot and to the shock and the second link at a third link pivot.

18. A bicycle frame according to claim 17 wherein a pedaling force applied to the chainstay provides a first frame geometry and a first mechanical advantage of the second link and one of a braking force or a bump force provides second frame geometry and a second mechanical advantage of the second link.

\* \* \* \* \*